(12) United States Patent
Jeong et al.

(10) Patent No.: US 6,756,066 B2
(45) Date of Patent: Jun. 29, 2004

(54) BEAN CURD CONTAINING LACTIC FERMENTING BACTERIA CULTURE FLUID AND A METHOD FOR PREPARING THE SAME, AND BEVERAGE CONTAINING THE SAME

(75) Inventors: Ga-Jin Jeong, Seoul (KR); John-N. Kim, 10810 Deep Glen Dr., Potamac, MD (US) 20854; Philomena-H. Kim, Potamac, MD (US); Jae-Won Ryu, Ontario (CA); Hong-Ui Han, Seoul (KR)

(73) Assignee: John-N. Kim, Potomac, MD (US)

( * ) Notice: Subject to any disclaimer, the term of this patent is extended or adjusted under 35 U.S.C. 154(b) by 0 days.

(21) Appl. No.: 10/089,422

(22) PCT Filed: Dec. 14, 2000

(86) PCT No.: PCT/KR00/01461

§ 371 (c)(1),
(2), (4) Date: Nov. 13, 2002

(87) PCT Pub. No.: WO01/43565

PCT Pub. Date: Jun. 21, 2001

(65) Prior Publication Data

US 2003/0091693 A1 May 15, 2003

(30) Foreign Application Priority Data

Dec. 17, 1999  (KR) ......................................... 1999/58572

(51) Int. Cl.$^7$ ................................................. A23L 1/20
(52) U.S. Cl. ............................ 426/46; 426/51; 426/52; 426/598
(58) Field of Search ............................. 426/46, 49, 51, 426/52, 590, 598, 599, 634, 615, 589

(56) References Cited

U.S. PATENT DOCUMENTS 4,806,481 A    2/1989   Yan et al.

FOREIGN PATENT DOCUMENTS

| EP | 60030639 | 2/1985 | |
| FR | 2738991 | 3/1997 | |
| KR | 1983-0009733 | 3/1988 | ............. A23L/1/20 |
| KR | 1998-068758 | 10/1998 | ............. A23L/1/20 |
| KR | 1999-0065688 | 8/1999 | ............. A23L/1/20 |
| WO | WO 97/43906 | 11/1997 | |

OTHER PUBLICATIONS

*Journal of the Science of Food and Agriculture*, "Soya–Yoghurt Starter Culture Development From Fermented Tropical Vegetables", L. Nsofor, et al., pp. 515–518, vol. 60, No. 4, 1992.

Primary Examiner—Keith Hendricks
(74) Attorney, Agent, or Firm—Blakely, Sokoloff, Taylor & Zafman

(57) ABSTRACT

The present invention relates to a method for preparing bean curd using lactic acid bacteria culture, and to a lactic acid beverage, and to a method for preparing the same. Specifically, the present invention provides a method for preparing bean curd containing lactic acid by preparing bean soup using soybeans, cooling the bean soup and adding lactic acid bacteria culture to the bean soup, and the bean curd prepared according to the method, and a method for preparing a lactic acid beverage by adding syrup or fruit juice to the bean soup remaining after preparing the bean curd, and the lactic acid beverage prepared according to the method.

7 Claims, 1 Drawing Sheet

BEAN CURD CONTAINING LACTIC FERMENTING BACTERIA CULTURE FLUID AND A METHOD FOR PREPARING THE SAME, AND BEVERAGE CONTAINING THE SAME

The present patent application is a non-provisional application of International Application No. PCT/KR00/01461, filed Dec. 14, 2000.

BACKGROUND OF THE INVENTION (a) Field of the Invention

The present invention relates to a method for preparing bean curd containing lactic acid bacteria culture, and to bean curd prepared according to the method, to a beverage containing lactic acid bacteria, and to a method for preparing the same. Specifically, the present invention relates to a method for preparing bean curd containing lactic acid bacteria by adding lactic acid bacteria culture to bean soup, and bean curd prepared according to the method, a method for preparing a beverage containing lactic acid using bean soup remaining after preparing the bean curd, and a beverage containing lactic acid prepared according to the method.

(b) Description of the Related Art

Proteins separated from beans can be denatured from soluble proteins to non-soluble proteins according to the concentration of salts, and these non-soluble proteins are compressed to make a bean curd that is loved by Orientals. In addition, positive health effects from foods made with beans, such as bean curd, have been newly found.

Beans are known to have anticancer effects due to lecithin, and to contain other healthful ingredients. For examples, an anticancer drug and a hypotensive are separated from soybean paste made from beans, and bean sprouts contain asparagine which protects the liver from hangovers.

However, bean curds are conventionally prepared using brine, and a new preparation method of bean curds has not been developed from the conventional method. Brine is a by-product obtained when sea salt absorbs moisture in the air due to its deliquescence property to dissolve and wash away ingredients other than the salts, over a long period of time. Accordingly, brine comprises various dissolved ingredients which are contained in sea water, including cations such as magnesium that are known to play an important role in making bean curds.

A deficiency in magnesium causes serious health problems since magnesium ions are physiologically important, but a high intake thereof can also cause physical problems. In addition, unpurified salts generate a bitter taste due to magnesium ions.

Accordingly, it can be predicted that the magnesium intake of Koreans exceeds a sufficient amount since bean curds made using brine are presently sold on the market, and unpurified salts are used in homes. Although the amount of magnesium intake from bean curds is not excessive because the amount of magnesium remaining in bean curds is not large, since Koreans habitually use sauces including fermented soybeans, considering the amount of magnesium contained in sauces, they consume an excessive amount of magnesium and are consequently attacked by related diseases of adults.

In addition, the taste of bean curds can be good while they are hot, but it cannot be preserved for a long time even if stored cold.

Particularly, bean curds are difficult to preserve for even one day without refrigeration, and microorganisms can grow under conditions in which constituents other than protein contained in beans remain even in trace amounts. However, there is no remedy for these problems.

Bean curds containing lactic acid are presently sold on the market, and Korean Patent Application No. 98-1089 discloses a method for preparing bean curds by lactic acid fermentation. However, according to the method, lactic acid is fermented and aged in soybeans to prepare bean curds containing lactic acid, and the method has a disadvantage in that manufacturing costs are high because it uses expensive diary products such as milk as well as beans, etc. as raw materials.

SUMMARY OF THE INVENTION

The present invention is made to solve these problems, and it is an object of the present invention to provide a method for preparing bean curds by using lactic acid bacteria culture, and to provide bean curds prepared according to the method. According to the method of the present invention, bean curds are prepared using lactic acid bacteria culture thereby eliminating factors hazardous to health, the lactic acid in lactic acid fermenting foods such as Kimchi is used thereby decreasing manufacturing costs, and the growth of Gram negative bacteria is inhibited due to lactic acid and lactic acid bacteria, thereby increasing storage properties and microbiological safety of bean curds.

It is another object of the present invention to provide a method for preparing a beverage containing lactic acid using bean soup remaining after preparing bean curds according to the above method, and to provide a beverage containing lactic acid prepared according to the method.

In order to achieve these objects, the present invention provides a method for preparing bean curds by adding lactic acid bacteria culture comprising the steps of:

a) preparing lactic acid bacteria culture by fermenting i) salt, sugar, water and ii) material which is one or more selected from a group consisting of vegetables, fruits, and a mixture thereof with lactic acid bacteria;

b) preparing the bean soup by pulverizing the soaked soybeans in water, heating, and filtering; and c) adding the lactic acid bacteria culture of step a) to the been soup cooled at 40° C.

In addition, the present invention provides bean curds prepared according to the method.

Specifically, the bean curds prepared according to the present invention comprises living lactic acid bacteria that increases the preservation property of bean curds compared to conventional bean curds, and also increases probability that lactic acid reaches the intestine when the bean curds are digested to increase intestine-cleaning effects.

The lactic acid bacteria culture is preferably prepared by mixing one or more of vegetables, fruits and mushrooms at room temperature using purified water such as tapped water in a basic medium comprising 2.5% salts and 1% sugar. Although the lactic acid bacteria can be prepared at room temperature without sterilization, sterilizing and aseptic operation should be preceded with for commercial production.

Favorable lactic acid bacteria existing in Kimchi are found in the lactic acid bacteria culture prepared as the above.

Any vegetables including radishes, cabbages, etc. can be used as the vegetables, and any fruit including pears, pineapples, etc. can be used as the fruits.

In addition, bean curd dregs which is solid components produced after filtering heated soybeans, can be added to one material or more selected from vegetables, fruits, and mushrooms. Specifically, the bean curd dregs can be utilized as good nitrogen and carbon sources when culturing lactic acid bacteria, because they are pulverized beans and can be further decomposed using microorganism enzymes. The bean curd dregs can be a substitute for medium for culturing the lactic acid, it cuts down the production cost.

Lactic acid bacteria have a property of inhibiting the growths of disease-causing bacteria and harmful bacteria because of the lactic acid produced by lactic acid fermentation, and they are used as a medicine for intestinal disorders because they inhabit the intestine to prevent abnormal fermentation of various bacteria. In addition, they are Gram positive and are common anaerobic or anaerobic bacteria, they have no motility, most are catalase negative, and they require various vitamins, amino acids, peptides, etc. for their growth. These lactic acid bacteria are largely classified into lactic acid bacillus and lactic acid micrococcus.

The representative example of the lactic acid bacillus is lactic acid bacteria pertaining to the genus Lactobacillus, which are aerobic lactic acid bacteria existing in the intestine of all mammals and in other animals, and are used to treat autopoisoning of the intestine.

The lactic acid micrococcus is further classified into the genera Streptococcus, Pediococcus and Leuconostoc, the lactic acid bacteria pertaining to the genus Pediococcus is streptococcus, and *P. pentosaceus* is mainly found in Kimchi. In addition, lactic acid bacteria pertaining to the genus Leuconostoc are diplococcus and *L. mesenteroides* produce a lot of gluten-like substance from sugar.

In the present invention, lactic acid bacteria pertaining to the genus Leuconostoc are preferably produced, because they are found in lactic acid fermenting foods such as Kimchi, they produce a similar amount of lactic acid as lactic acid bacteria pertaining to other genera and they are inexpensive.

The degree of lactic acid production decreases to pH 5.0 or lower within 48 hours after fermentation in the case of natural fermentation, thereby inhibiting the growth of non-acid resistant bacteria. Lactic acid bacteria culture undergoing sufficient lactic acid production for 72 hours or more is preferably used. Other lactic acid bacteria can be used to prepare bean curd by controlling growth conditions when preparing lactic acid bacteria culture.

The preferable lactic acid bacteria culture is from Kimchi.

In addition, bean curd is conventionally prepared in hot conditions by boiling bean soup, while in the present invention, lactic acid bacteria culture is added to bean soup after the bean soup is cooled so that the bean curd contains living lactic acid bacteria. Thus, even when cooked at high temperature, although lactic acid bacteria cannot survive, the effect of the lactic acid intake lasts and adult disease prevention and intestine cleaning effects are shown, and the bean curd preserving effect is still shown until that point.

The temperature to which to cool the bean soup is preferably 40° C. or less.

Conventionally, in order to prepare bean curd, raw material soybeans are carefully selected and adulterants other than soybeans are removed. After selection, the soybeans are washed well and soaked in water to sufficiently absorb water. At this point, the weight of the soybeans increases by approximately 2.2 to 2.3 times. The soybeans are pulverized while absorbing water, and the pulverized soybeans are heated to approximately 100° C. using sour milk neutralized with $Ca(OH)_2$ or silicon resin as a deformer. The heated pulverized soybeans are filtered to obtain bean soup, and the bean soup is coagulated at 70 to 75° C. using brine or $CaCl_2$, etc., while stirring, to obtain bean curd. In the present invention, after coagulating the bean soup at 70 to 75° C., the heated pulverized soybeans are cooled, and lactic acid bacteria culture is added to the cooled soybeans without using brine or $CaCl_2$ to coagulate the bean soup, thereby preparing bean curd comprising lactic acid bacteria.

The present invention also provides a method for preparing a beverage containing lactic acid bacteria as the above by mixing bean soup remaining after preparing bean curd using the lactic acid bacteria culture with syrup or fruit juice.

For example of the present invention, a beverage containing lactic acid bacteria as the above comprising the steps of:

a) preparing lactic acid bacteria culture by fermenting i) salt, sugar, water and ii) material which is one or more selected from a group consisting of vegetables, fruits, and a mixture thereof with lactic acid bacteria;

b) preparing the bean soup by pulverizing the soaked soy bean in water, heating and filtering;

c) adding the lactic acid bacteria culture of step a) o the bean soup cooled at 40° C.; and d) mixing syrup or fruit juice with the bean soup remaining after preparing bean curds of step c).

The present invention also provides a lactic acid beverage.

The bean soup remaining after preparing bean curd contains various organic substances such as amino acids, vitamins, fiber, etc., inorganic salts and important lactic acid bacteria. Thus a healthy lactic acid beverage can be prepared by adding additives containing appropriate favors such as syrup or fruit juice, etc. to the bean soup.

Accordingly, as shown in FIG. 1, lactic acid bean curd can be prepared by preparing bean soup using soybeans, cooling it at 40° C. and introducing lactic acid bacteria culture into the cooled bean soup, and it can also be prepared by preparing lactic acid bacteria culture using bean dregs remaining after preparing bean soup and introducing the lactic acid bacteria culture into the cooled bean soup. Also, lactic acid beverage can be prepared by adding additives such as syrup and fruit juice to the bean dregs remaining after preparing bean curd.

In addition, the present invention can be prepared bean curd adding the lactic acid bacteria culture, and prepared bean curd adding organic acid.

For example of the present invention, a bean curd as the above comprising the steps of:

a) soaking soybeans in water;

b) pulverizing the soaked soybeans of step a);

c) heating the pulverized soybeans of step b) using a deformer;

d) filtering the heated pulverized soybeans of step c) to prepare bean soup; and e) cooling at 40° C. the bean soup of step d) and adding lactic acid thereto.

The organic acid is preferably lactic acid or acetic acid.

DETAILED DESCRIPTION AND THE PREFERRED EMBODIMENTS

Figure 1:
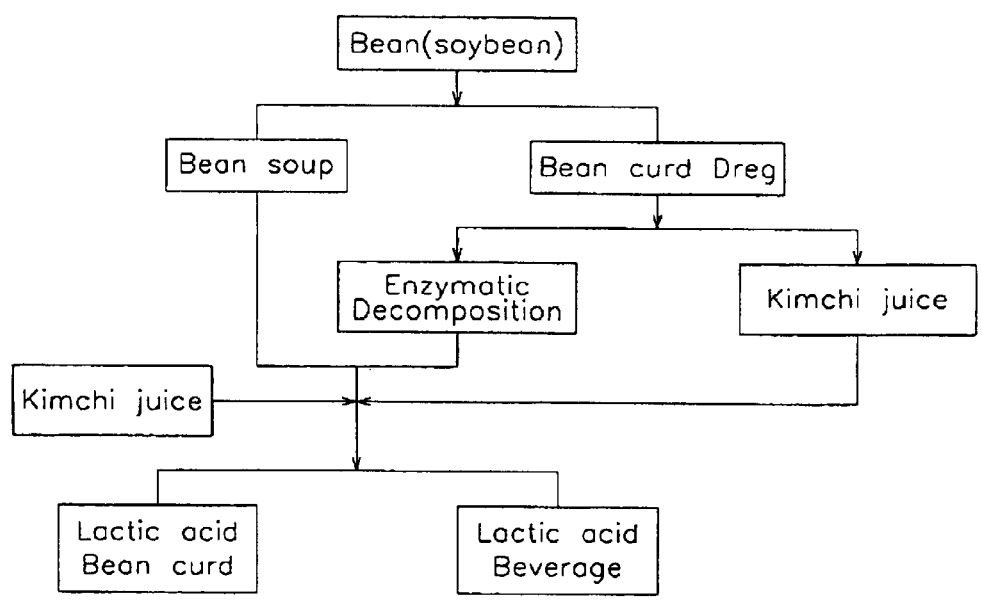
FIG. 1 shows a process chart for preparing lactic acid bean curd and a lactic acid beverage according to one embodiment of the present invention.

The present invention will now be explained with reference to the following Examples. However, these are to illustrate the present invention and the present invention is not limited to them.

EXAMPLES 1–7

50 g of cabbage, 60 g of garlic, 100 g of pear, 40 g of unripe hot peppers, 65 g of pineapple, 10 g of potatoes and 75 g of radish were weighed and introduced into each 360 mL bottles. A mixture of salts and sugar was prepared by mixing 100 g of salts, 40 g of sugar, and water such that the mixture reached 4 L. 330, 337, 301, 347, 337, 290 and 284 mL of the mixture were respectively introduced into each bottle, and the bottles were left to stand at room temperature for 3 days.

The pH of the lactic acid bacteria culture prepared according to the Examples 1–7 was 3.5.

Comparative Example 1

The solution was prepared by mixing salts, sugar and water. The pH of the solution was 6.0.

EXAMPLES 8–14

Bean curds for Examples 8 to 14 were prepared by adding 3 mL of soybean milk (Samyook soybean milk) to 2 mL of the lactic acid bacteria culture prepared for each of Examples 1 to 7.

EXAMPLE 15

Bean curd was prepared by adding 3 mL of soybean milk (Samyook soybean milk) to 2 mL of vinegar (Double Strength Apple Vinegar, from Otugi Food Company).

Comparative Example 2

Bean curd was prepared by adding 3 mL of soybean milk to 2 mL of the solution of Comparative Example 1.

Comparative Example 3

Bean curd was prepared by the same method as in Comparative Example 2, except that only soybean milk was used, with no solution.

The results are presented in the following Table 1.

TABLE 1

|  | Coagulation |
| --- | --- |
| Example 8 | ◯ |
| Example 9 | ◯ |
| Example 10 | ◯ |
| Example 11 | ◯ |
| Example 12 | ◯ |
| Example 13 | ◯ |
| Example 14 | ◯ |
| Example 15 | ◯ |
| Comparative Example 2 | X |
| Comparative Example 3 | X |

As can be seen from the Table 1, in Examples 8 to 14 according to the present invention, soybean milk was coagulated after the lactic acid bacteria culture was introduced to prepare bean curd, while, and it did so quickly, while in Comparative Examples 2 and 3 where the lactic acid bacteria culture was not introduced, soybean milk was not coagulated. Particularly, in the case when radish was used, soybean milk was most rapidly coagulated to prepare bean curd. In addition, even when organic acid such as vinegar was directly added during the bean curd preparing process, soybean milk was coagulated, which indicates that bean curd can be prepared using organic acid.

The present invention uses fermented lactic acid bacteria culture to prepare bean curd, thereby standardizing a bean curd preparation method, and prepares bean curd and a beverage containing lactic acid with improved preservation properties and increases lactic acid intake thereby improving peoples' health.

In addition, the present invention prepares lactic acid containing bean curd and a beverage by fermenting lactic acid bacteria culture using bean curd dregs that are by-product produced when preparing bean curd and introducing it during the bean curd preparation process, thereby decreasing preparation costs of bean curd and lactic acid beverages and providing bean curd and a beverage rich in lactic acid.

What is claimed is:

1. A method for preparing bean curd comprising the steps of:

a) preparing a lactic acid bacteria culture by fermenting i) salt, sugar, water and ii) material which is one or more selected from the group consisting of cabbage, radish, pear, pineapple and a mixture thereof with lactic acid bacteria;

b) preparing a bean soup by pulverizing soy beans soaked in water, heating, and filtering; and c) adding the lactic acid bacteria culture of step a) to the bean soup, thereby forming a bean curd.

2. The method for preparing bean curd according to claim 1, wherein the lactic acid bacteria culture of step a) is lactic acid bacteria existing in Kimchi.

3. A bean curd prepared according to the method of claim 1.

4. A method for preparing beverage containing lactic acid bacteria comprising the steps of:

a) preparing lactic acid bacteria culture by fermenting i) salt, sugar, water and ii) material which is one or more selected from the group consisting of cabbage, radish, pear, pineapple and a mixture thereof with lactic acid bacteria;

b) preparing a bean soup by pulverizing soy beans soaked in water, heating, and filtering; and c) adding the lactic acid bacteria culture of step a) to the bean soup to prepare bean curd;

d) separating the bean soup remaining from the bean curd; and e) mixing syrup or fruit juice with the remaining bean soup.

5. Beverage prepared according to claim 4.

6. A method for preparing bean curd according to claim 1, wherein the bean soup is cooled at 40° C.

7. A method for preparing beverage containing lactic acid bacteria according to claim 4, wherein the bean soup is cooled at 40° C.

\* \* \* \* \*